US011208506B2

(12) United States Patent
Tribo et al.

(10) Patent No.: US 11,208,506 B2
(45) Date of Patent: Dec. 28, 2021

(54) REMOVAL OF UNREACTED MONOMERS AND OTHER MATERIALS FROM POLYOLEFIN PRODUCT PARTICLES

(71) Applicant: ExxonMobil Chemical Patents Inc., Baytown, TX (US)

(72) Inventors: Michael G. Tribo, Beaumont, TX (US); David J. Sandell, Sparks, NV (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 33 days.

(21) Appl. No.: 16/632,770

(22) PCT Filed: Apr. 11, 2018

(86) PCT No.: PCT/US2018/027153
§ 371 (c)(1),
(2) Date: Jan. 21, 2020

(87) PCT Pub. No.: WO2019/022799
PCT Pub. Date: Jan. 31, 2019

(65) Prior Publication Data
US 2020/0172638 A1  Jun. 4, 2020

Related U.S. Application Data

(60) Provisional application No. 62/537,284, filed on Jul. 26, 2017.

(51) Int. Cl.
*C08F 6/00* (2006.01)
(52) U.S. Cl.
CPC .................................. *C08F 6/005* (2013.01)

(58) Field of Classification Search
None
See application file for complete search history.

(56) References Cited

U.S. PATENT DOCUMENTS 4,372,758 A   2/1983  Bobst et al.
4,543,399 A   9/1985  Jenkins, III et al.
(Continued)

FOREIGN PATENT DOCUMENTS

EP   0513816 A2 *  11/1992  ................ B01J 8/18
EP   0513816 A2     11/1992
EP   0571826         2/1997

OTHER PUBLICATIONS

Wen, C. Y. and Yu, Y. H. "A Generalized Method for Predicting the Minimum Fluidization Velocity". AIChE Journal 1966, 12(3), 610-612. (Year: 1966).*

*Primary Examiner* — Richard A Huhn
(74) *Attorney, Agent, or Firm* — ExxonMobil Chemical Patents Inc.—Law Department

(57) ABSTRACT

A method for the removal of unreacted olefin monomer(s) from polyolefin product particles of an olefin polymerization reaction, the method including: contacting the polyolefin product particles with a countercurrent flow of a purge gas in a purge vessel under conditions allowing diffusion of unreacted monomer and other gaseous substances from the polyolefin product particles into the countercurrent flow of the purge gas to produce purged particles; wherein the velocity of the purge gas exceeds 50% of the calculated minimum fluidization velocity of the polyolefin product particles in the purge vessel ($U_{mf}$), is provided.

13 Claims, 2 Drawing Sheets

(56) References Cited

U.S. PATENT DOCUMENTS

| | | | |
|---|---|---|---|
| 4,994,534 A * | 2/1991 | Rhee | C08F 2/44 |
| | | | 526/88 |
| 5,306,792 A | 4/1994 | Havas | |
| 5,688,910 A | 11/1997 | Wang | |
| 8,470,082 B2 | 6/2013 | Blickley et al. | |
| 2017/0129969 A1 | 5/2017 | Sandell | |

* cited by examiner

REMOVAL OF UNREACTED MONOMERS AND OTHER MATERIALS FROM POLYOLEFIN PRODUCT PARTICLES

CROSS REFERENCE TO RELATED APPLICATIONS

This application is a National Stage Application of International Application No. PCT/US2018/027153 filed Apr. 11, 2018, which claims the benefit of U.S. Ser. No. 62/537,284, filed Jul. 26, 2017, the disclosure of which is hereby incorporated by referenced in its entirety.

FIELD OF THE INVENTION

The disclosure relates to purging of unreacted monomer and other gases from resin particles that are produced in olefin polymerization processes, for example, gas phase olefin polymerization processes.

BACKGROUND OF THE INVENTION

Gas phase polymerization is a useful and efficient process for the polymerization of olefins, such as ethylene and propylene, and the copolymerization of ethylene and/or propylene with $C_4$-$C_8$ alpha-olefins. Such gas-phase polymerization processes can, in particular, be designed as gas-phase fluidized-bed processes in which the polymer particles are kept in suspension by means of a suitable gas stream. Processes of this type are described in, for example, EP-A-0 475 603, EP-A-0 089 691 and EP-A-0 571 826.

In such processes, the polymer particles produced in the fluidized bed are discharged continuously or discontinuously from the reactor and conveyed to a product recovery system. The polymer particles inevitably contain small amounts of unreacted monomer as well as heavier hydrocarbons added to, or produced in, the polymerization process. For example, the polymer particles may contain saturated homologues of the feed monomers produced by hydrogen supplied to the reactor to control the molecular weight of the product polymer and/or condensable liquids, such as $C_4$ to $C_6$ alkanes, added to assist in heat removal. The polymer particles might also contain substantial amounts of internal olefin isomers, such as 2-butene or 3-hexene. Thus, the polymer product recovery system includes a degassing or purging vessel where unreacted monomers and heavier hydrocarbons are stripped from the polymer particles normally by countercurrent contact with an inert gas, typically nitrogen, or a light hydrocarbon gas, for example, ethylene (or a mixture of inert and hydrocarbon gases). The resulting inert gas stream, diluted with unreacted monomer and heavier hydrocarbons, is recovered from the purge vessel and further processed, for example by separation of hydrocarbon components from the inert gas, which may be partially recycled as the conveying gas or, in another configuration, as part of the purge stream. One such process is disclosed in U.S. Pat. No. 4,372,758. WO201062526 also discloses systems and methods for performing countercurrent purging as described above.

Although existing monomer purge systems work well, there is a continuing need to increase purge rate and/or efficiency.

SUMMARY OF THE INVENTION

In a class of embodiments, the invention provides for a method for the removal of unreacted olefin monomer(s) from polyolefin product particles of an olefin polymerization reaction, the method comprising: contacting the polyolefin product particles with a countercurrent flow of a purge gas in a purge vessel under conditions allowing diffusion of unreacted monomer and other gaseous substances from the polyolefin product particles into the countercurrent flow of the purge gas to produce purged particles; wherein the velocity of the purge gas exceeds 50% of the calculated minimum fluidization velocity of the polyolefin product particles in the purge vessel ($U_{mf}$).

The $U_{mf}$ may be calculated by:
i) calculating an Archimedes number (Ar) for a spherical particle model as:

$$Ar = \frac{\rho_g d_p^3 (\rho_p - \rho_g) g}{\mu^2};$$

ii) calculating a Reynolds number ($Re_{p,mf}$) by solving the polynomial:

$$Re = \sqrt{33.7^2 + 0.0408 Ar} - 33.7;\text{ and}$$

iii) calculating $U_{mf}$ as:

$$U_{mf} = \frac{(Re_{p,mf}) \mu}{\rho_g d_p};$$

wherein $\rho_g$ is the purge gas density, $\rho_p$ is the particle density, $d_p$ is the Sauter mean particle size, g is the acceleration due to gravity, and $\mu$ is the fluid viscosity.

DETAILED DESCRIPTION OF THE INVENTION

Figure 1:
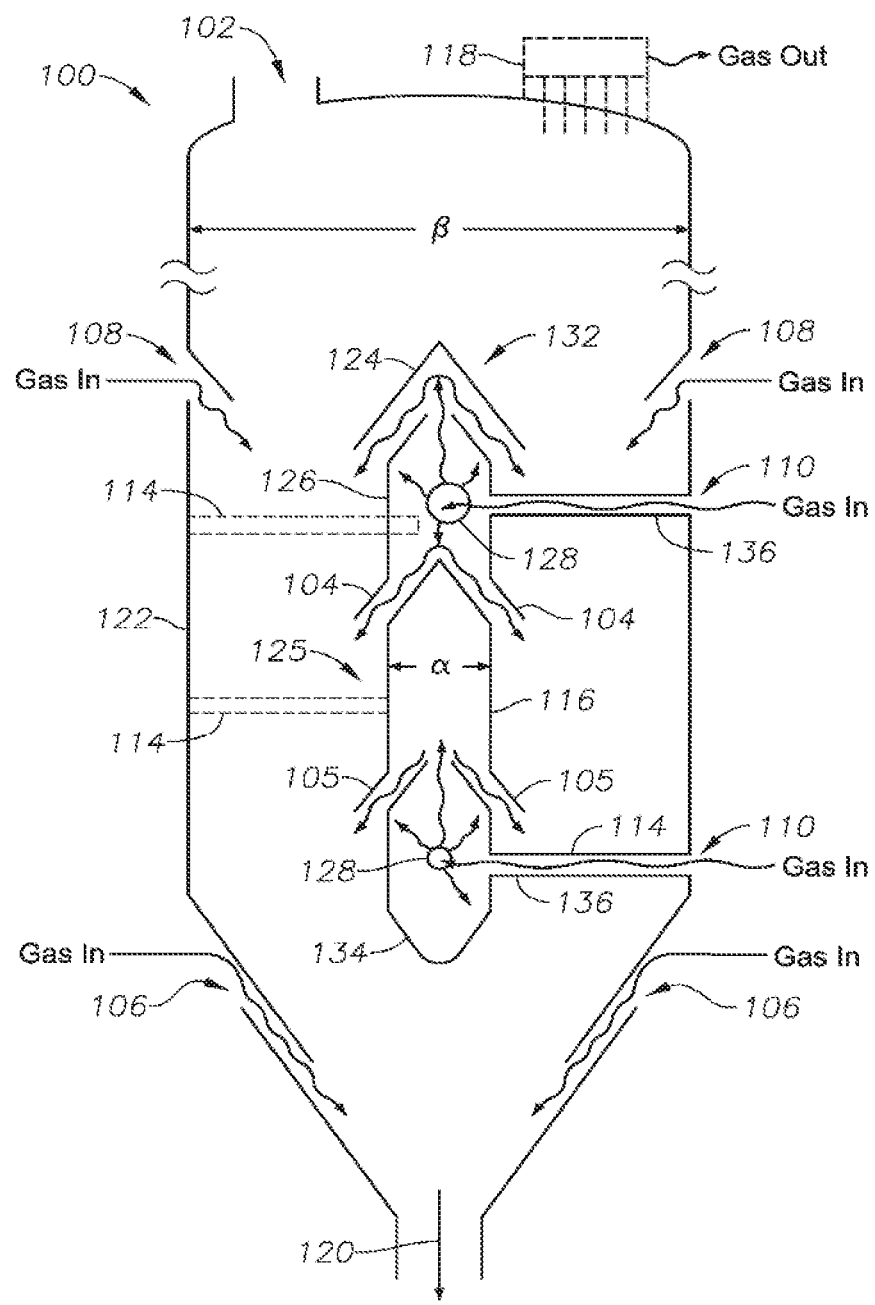
FIG. 1 illustrates an embodiment of a purge vessel implementing a process of the claimed invention.

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It was conventionally believed that in purging unreacted monomer from polyolefin product particles, the purge gas should be delivered under a condition not exceeding the minimum fluidization velocity of the resin in the purge vessel ($U_{mf}$), and should preferably be provided at 50% or less of $U_{mf}$, with the $U_{mf}$ of the resin normally being calculated using the Wen-Yu equation. Fluidization leads to back-mixing and resultant premature discharge of relatively unpurged resin. Thus, purging in the fluidization regime is believed to dramatically increase atmospheric hydrocarbon emissions and potentially create unsafe conditions in downstream equipment such as continuing to evolve or emit hydrocarbons trapped within polyolefin product particles.

However, contrary to the conventional wisdom, the present inventors have found that the purging operation of a polymer production plant can be safely and effectively performed using a countercurrently flowing purge gas at a flow velocity above the calculated minimum fluidization velocity. Accordingly, disclosed herein, in various classes of embodiments, is a method for the removal of unreacted olefin monomer(s) from a particulate product of an olefin polymerization reaction comprising contacting a particulate polyolefin product with a countercurrent flow of a purge gas in a purge vessel under conditions allowing diffusion of unreacted monomer and other gaseous substances from the polyolefin product particles into the countercurrent flow of the purge gas wherein the velocity of the purge gas exceeds 50% of the calculated minimum fluidization velocity of the polyolefin product particles in the purge vessel ($U_{mf}$). In some instances, the purge gas can be provided at up to 135% of $U_{mf}$ or greater.

In several classes of embodiments, the present disclosure is directed to the purging of unreacted monomer and other gases from resin particles that are produced olefin polymerization processes. The present purging method is generally applicable to a wide variety of olefin polymerization processes, including (1) gas-phase polymerization processes, including fluidized bed, horizontal stirred bed, and vertical stirred bed reactors, (2) bulk processes, including liquid pool and loop reactors, (3) slurry processes, including continuous stirred-tank, batch stirred-tank, loop and boiling butane reactors, (4) tubular processes, (5) autoclave processes, and/or (6) solution processes. The present process is, however, particularly useful for purging of unreacted monomer and other gases from resin particles obtained from the gas phase polymerization of ethylene, propylene, and mixtures of ethylene and/or propylene with $C_4$-$C_{12}$ alpha-olefins, particularly, $C_4$-$C_8$ alpha-olefins. For simplicity, in several embodiments, the present disclosure focuses on the application of the present recovery method to gas phase polymerization processes.

In gas phase olefin polymerization processes, the desired olefin monomer(s) are contacted with a catalyst carried by solid particles from which the polymer chains grow. The catalyst particles are normally fluidized in a fluidized bed reactor by a gas stream containing the monomer(s). The polymer produced in the fluidized bed is discharged continuously or discontinuously from the reactor and conveyed pneumatically to a product recovery system. The polymer particles inevitably contain small amounts of unreacted monomer as well as heavier hydrocarbons added to, or produced in, the polymerization process. For example, the polymer particles may contain saturated homologues of the feed monomers produced by hydrogen supplied to the reactor to control the molecular weight of the product polymer. In addition, since the polymerization reaction is exothermic, condensable liquids, such as $C_4$ to $C_8$ alkanes, may be added to the reactor to assist in heat removal. These higher alkanes are vaporized in the reactor and become entrained in the polymer product exiting the reactor. The polymer particles might also contain substantial amounts of internal olefin isomers, such as 2-butene or 3-hexene.

The unreacted monomers and heavier hydrocarbons that are entrained in the polymer product must be removed before the polymer product is sent to storage or further processing. Thus, after leaving the reactor, the polymer powder is conveyed, typically by a stream of nitrogen or other inert gas, into a degassing or purging vessel, where unreacted monomers and heavier hydrocarbons are stripped from the polymer particles normally by countercurrent contact with a purge gas. In some instances, a "recovery gas" from the polymer production process and comprising a mixture of nitrogen and ethylene (and perhaps other monomers) can be used to convey polymer product to the purge vessel.

Generally the requisite stripping is accomplished by blowing a stream of an inert gas, normally nitrogen (a "puree gas"), countercurrently up from the bottom of the purge vessel through the polymer flowing down from the top of the vessel. This flushes out entrained reactor gas and strips and desorbs dissolved hydrocarbons out of the product powder. The gaseous effluent stream exiting the top of the purge vessel contains these desorbed hydrocarbons.

In some embodiments, the conditions in the purge vessel are not closely controlled, but typically include a temperature of from 20 to 120° C., such as from 65 to 85° C., and a pressure from 100 to 200 kPa-a, such as from 130 to 165 kPa-a. Under these conditions, the purge stream is effective to strip the hydrocarbon impurities from the polymer product.

In the past, the countercurrent flow of the purge gas was maintained at a rate that was below a calculated minimum fluidization velocity, $U_{mf}$. The common wisdom was that the purge gas should be delivered to a settled bed of the resin particles to be purged at a velocity that was no more than 50% of the calculated $U_{mf}$. The present inventors have unexpectedly found that a bed of resin particles being purged or stripped by countercurrent flow of a purge gas or a stripping gas (which as explained below comprises an inert gas that can be used as a purge gas, and also some amount of gases carried over from the polymerization reaction and/or purged from the resin) will remain settled, or perhaps expanded in volume, but is not mixing, despite the flow of the purge or stripping gas through the settled bed at a velocity higher than the calculated $U_{mf}$. In general, the efficacy of purging drops sharply at the point of mixing. In various embodiments, the purge and/or stripping gas is delivered to a settled bed of the resin particles to be purged at a velocity that is greater than 50% of the calculated $U_{mf}$, and may be up to 135% or greater of the calculated $U_{mf}$.

In some embodiments, the velocity of the purge or stripping gas is ≥60%, such as ≥75%, such as ≥85% of the calculated $U_{mf}$. For example, the velocity of the purge or stripping gas can be ≥90% of the calculated $U_{mf}$ or even 100% of the calculated $U_{mf}$.

In other embodiments, the velocity of the purge or stripping gas can be in the range from 85% to 135% of the calculated $U_{mf}$, for example ranging from 90% to 135% of the calculated $U_{mf}$, or from 100% to 135% of the calculated $U_{mf}$, or from 90% to 105% of the calculated $U_{mf}$, or from 105% to 135% or greater of the calculated $U_{mf}$.

A few different theoretical approaches to calculating $U_{mf}$ are known. The state of the art at the time the present invention was made suggests that the Wen-Yu equation, a simplified expression of the classic Ergun equation, is an accurate way to calculate $U_{mf}$ of a polyolefin (e.g., polyethylene) powder. However, the present inventors have found that the Wen-Yu equation does not appear to correctly predict the onset of fluidization by a gas flow through a settled bed in a commercial purging vessel. Countercurrent flows in a purging vessel are dependent not only on velocity of the gas flow, but also upon a "shape factor" relating to the shape of the particles. In the Wen-Yu simplification, the shape factor and bed voidage at fluidization are assumed to be 0.9 and 0.406, respectively. Additionally, experimental attempts to correlate $U_{mf}$ to the Wen-Yu equation are typically done at relatively cold conditions with no hydrocarbon dissolved in the particles, both of which contribute to resin stickiness and particle clumping in a commercial process. Without being bound to theory, the inventor speculates that this clumping phenomenon may explain why it has been possible to demonstrate lack of fluidization in a commercial purger because the actual effective average particle size (APS) of the "clumped" resin is larger than when it is measured in a laboratory under cold, non-sticky conditions.

$U_{mf}$ may be calculated by:
i) calculating an Archimedes number (Ar) for a spherical particle model as:

$$Ar = \frac{\rho_g d_p^3 (\rho_p - \rho_g) g}{\mu^2};$$

ii) calculating a Reynolds number ($Re_{p,mf}$) by solving the polynomial:

$$Re = \sqrt{33.7^2 + 0.0408 Ar} - 33.7;$$

iii) calculating $U_{mf}$ as:

$$U_{mf} = \frac{(Re_{p,mf}) \mu}{\rho_g d_p},$$

wherein, $\rho_g$ is the purge gas density, $\rho_p$ is the particle density, $d_p$ is the Sauter mean particle size, g is the acceleration due to gravity and $\mu$ is the fluid viscosity. The "Sauter mean particle size" is calculated as the ratio of the surface area of a sphere having a diameter of the average size of the polymer product particles to the volume of such a sphere. (See, e.g., Wen, C. Y. and Yu, Y. H. (1966), "A generalized method for predicting the minimum fluidization velocity", *AIChE J.*, 12: 610-612.)

Polyolefin product particles may have a density in the range of from 0.870 to 0.950 g/cm³, In some implementations of the disclosed method, the particle density ranges from 0.900 to 0.950 g/cm³. In some implementations of the disclosed method, the particle density ranges from 0.870 to 0.920 g/cm³. In some implementations of the disclosed method, the particle density ranges from 0.910 to 0.940 g/cm³. In some implementations of the disclosed method, the particle density ranges from 0.910 to 0.930 g/cm³. In some implementations of the disclosed method, the particle density ranges from 0.912 to 0.921 g/cm³ or from 0.913-0.934 g/cm³. Additionally or alternatively, in some implementations of the disclosed method, the Sauter mean particle size is from 325 to 775 microns. In some implementations of the disclosed method the Sauter mean particle size is from 345 to 750 microns or from 345 to 700 microns. In some implementations of the disclosed method, the Sauter mean particle size is from 425 to 750 microns. In some implementations of the disclosed method, the Sauter mean particle size is from 400 to 750 microns. In some implementations of the disclosed method the Sauter mean particle size is from 425 to 750 microns. In some implementation of the disclosed method, the Sauter mean particle size is from 440 to 650 microns. In some implementations of the disclosed method, the Sauter mean particle size is from 440 to 600 microns. In some implementations of the disclosed method, the Sauter mean particle size is from 440 to 595 microns.

A known property of granular flows is that two distinct flow regimes can be observed, mass flow and funnel flow, depending on the material properties of the grains and walls, and mostly on the hopper geometry (e.g., grain-wall friction, opening angle, orifice size, among others). In engineering applications, mass flow is usually desired, since it is the flow regime where grains leave the hopper in a "first-in, first-out" order. On the other hand, funnel flow is characterized by the presence of zones, so that part of the grains is slower or immobile and acts as a funnel next to the hopper walls, (See, e.g., F. Magalhaes et al., *arXiv*:1507.06223v1 (Jul. 22, 2015).) In several classes of embodiments, it is preferred that the particles move through the purge vessel in a mass flow regime.

The shape of the purge vessel and any of its internal components can be engineered to promote mass flow. The purge vessel is typically an upright linear tube or an upright linear tube with a conical section at the bottom. The purge vessel might include within it a "hat" of conical shape located just above a conical section at the bottom (note, for example, element 124 in FIG. 1). The internal surfaces of the purge vessel and its internal components can be covered with coating(s) to reduce friction from contact with particles moving over them to promote mass flow.

Usually, polyolefin polymerization processes make use of a purge vessel downstream from the reactor vessel to remove unwanted volatiles from the polymer resin. The purge vessel is a vessel where a resin mixture enters the upper portion of the vessel and is subjected to purging gas through ports or openings at the bottom of the vessel or proximate thereto, and possibly along the sides and other areas of the vessel to remove the volatiles through a purging effect. (See, for example, U.S. Pat. Nos. 3,797,707, 4,286,883, 4,758,654, and 5,462,351.)

In some implementations of the disclosed method, the purge and/or stripping gas is introduced only at or proximate to the bottom of the purge vessel. However, in some implementations, the purge and/or stripping gas can be introduced at points higher along the length of the purge vessel. in such instances, one can calculate the % Umf at levels in the purge vessel above the higher point(s) of gas introduction using the summed velocities of the gas feeds below each such higher point(s). In this way it would be possible to have a higher section in which the bed is fluidizing and a lower section in which the particles are in a mass flow regime. Care would need to be taken to distribute the gas evenly through the particle bed at the higher point(s) of purge and/or stripping gas introduction, or else channel flow could occur.

Simply piping a purging gas into the resin without taking into account solids flow distribution, distribution of the purging gas through the resin, resin flow patterns, and any potential heating effect of the purging gas can result in damage to the resin and possibly lead to poor or non-commercially viable polymer products. In addition, the time that the resin is exposed to the purging gas also affects the degree to which the volatiles are removed from the resin.

The interface between the resin and the purge vessel along with any associated projections (such as pipes, tubes, supports, etc., that may protrude into the resin flow path) also has an effect on the flow rate of the resin through the purge vessel. Since volatiles are purged from the resin in an amount dependent on the time of contact between the resin and the purge gas, any uneven flow pattern of the resin (i.e., slower or faster resin flow) will affect the amount of volatiles that are purged. Accordingly, the amount of volatiles removed differs from one portion of the purge vessel to another dependent on the flow pattern of the resin. Therefore, the resin flow through the purge vessel should be decreased such that the portion of the resin that is exposed to the purging gas for the least amount of time (i.e., the portion of the resin moving the fastest through the purge vessel), has sufficient contact time with the purge gas to remove the desired amount of volatiles. This decrease in the overall solids flow rate through the purge vessel results in more time needed to purge the resin after polymerization, thus, decreasing the efficiency of the entire process.

Therefore, a more uniform cross-sectional flow rate of the resin through the purge vessel is desirable to promote a more uniform resin residence time and dispersion of purging gas through the resin, so that less time is needed to purge the volatiles from the resin to an acceptable level.

WO 2010/62562 describes and illustrates embodiments of a purge vessel that addresses the above issues.

In some implementations of the present method, the purged particles are collected upon a conical base of a purge vessel.

Contact of the polyolefin product particles with the inert gas purge stream can be preceded by contacting the particles with one or more gaseous "stripping" streams that are obtained by separating and recycling one or more portions of the gaseous effluent stream from a purge vessel. As discussed above, the gaseous effluent stream from the purge vessel comprises inert gas and the hydrocarbons stripped from the polymer product, that is, unreacted monomer and normally heavier hydrocarbons. These can be separated and recycled. Thus, a suitable separation process for obtaining a desired recycle stream comprises compressing and cooling the gaseous effluent stream from the purge vessel to condense a liquid stream containing at least part of the heavy hydrocarbon impurities and leave a second gaseous effluent stream comprising inert gas, unreacted monomer and normally some residual heavier hydrocarbons. At least part of the second gaseous effluent stream can then be further separated, for example, to remove at least one stream sufficiently rich in unreacted monomer to facilitate monomer recovery, before part or all of the remainder of the second gaseous effluent stream is recycled to the purge vessel as a gaseous stripping stream. Suitable methods of separation are known in the art.

Now referring to FIG. 1, there is shown a system 100 for adding and/or removing gas from a solids/gas mixture in a barrier, which may be a bin, tube, pipe, etc., where the barrier may have any cross-sectional shape, such as a round, oval, polygonal, etc. For the sake of simplicity, and not limiting the invention in any way, the barrier has been depicted in FIG. 1 as a purge vessel 122, and all the descriptions accompanying the figures when referencing the barrier refer to a purge vessel. However, the purge vessel 122 and any type of barrier may be interchanged in the descriptions below without affecting the scope and breadth of the invention. In FIG. 1, the purge vessel is shown foreshortened, and the various elements other than 102 and 118 shown are located nearer to the bottom than to the top of the purge vessel.

Generally, solids/gas mixture flow enters through an upper inlet 102 near the upper portion of the purge vessel 122, continues through the purge vessel 122, and exits through the lower discharge 120 of the purge vessel 122. However, more than one inlet and outlet are possible, and several flows may be used in a single purge vessel 122, along with other approaches of handling the solids/gas mixture flow.

In some embodiments, the purge vessel 122 may include an insert 132, which may be comprised of an inverted cone 124 and a member 125. The inverted cone 124 and/or member 125 may have any cross-sectional shape, such as a round, oval, polygonal, etc. Moreover, the inverted cone 124 and/or member 125 may have a pointed tip, rounded tip, square tip, etc. In some preferred embodiments, the inverted cone 124 may have steep angles and smooth surfaces such that mass flow is promoted in the purge vessel 122. The insert 132 may promote solids mass flow around the exterior surfaces thereof by having smooth surfaces, and in some embodiments, the member 125 may be comprised of any number of member sections, such as member sections 126, 116, 134, which may be included below the inverted cone 124 to maintain near plug flow in the annular space.

In some embodiments, the member 125 may be comprised of member sections which may have the same or different shapes and functionalities than other member sections. For instance, in FIG. 1, member section 126 is shown with two gas inlets, a gas flow path toward the inverted cone 124, and gas flow paths downward. Gas flows out of filter 118, and in preferred embodiments, substantially all gas may flow out of filter 118. However, gas may flow out of any another withdrawal point introduced into the purge vessel 122 including the filter 118. The arrangement, design, and selection of each member section included with the inverted cone 124, if any, is a decision that depends on the desired effect of the insert 132 as a whole, and the number of and distribution of gas inlet and withdrawal points.

As shown, the inverted cone 124 may be a separate piece from the upper member section 126. In other approaches, the inverted cone 124 may be part of the upper member section 126, e.g., may be the upper end of the upper member section 126.

In some embodiments, an outer diameter of the member 125 may be from about 75% to about 100% of an outer diameter of the inverted cone 124. Thus, the inverted cone 124 may have the same outside diameter as the member 125, resulting in an insert 132 having a substantially consistent outside diameter. In other approaches, the outer diameter of the member 125 may be greater than the outer diameter of the inverted cone 124. In some embodiments, the outer diameter of the member 125 may be from about 75% to about 90%, or from about 80% to about 90% of the outer diameter of the inverted cone 124. In other embodiments, the outer diameter of the member 125 may be from about 80% to about 100%, or from about 90% to about 100% of the outer diameter of the inverted cone 124.

In addition, the member 125 may be part of the purge vessel 122, like an extension, or it may be an independent part. Preferably, the outer diameters referenced herein are measured at the points farthest apart of the referenced part, but may also refer to a median or average outer diameter thereof.

In some other embodiments, an outer diameter of the member 125 may be from about 50% and about 95% of an inner diameter of a portion of the purge vessel 122 adjacent thereto. In another approach, an outer diameter of the inverted cone 124 and/or member 125 may be from about 50% and about 95% of an inner diameter of a portion of the purge vessel 122 adjacent thereto. In some embodiments, the outer diameter of the inverted cone 124 and/or member 125 may be from about 50% to about 80%, or from about 55% to about 75%, or from about 60% to about 70%, of the inner diameter of a portion of the purge vessel 122 adjacent thereto. In other embodiments, the outer diameter of the inverted cone 124 and/or member 125 may be from about 60% to about 95%, or from about 70% to about 85%, of the inner diameter of a portion of the purge vessel 122 adjacent thereto. Thus, there may be a relationship between the outer diameter of the member 125 and/or of the inverted cone 124 and the inner diameter of the purge vessel 122.

In some embodiments, skirts 108 on the interior walls of the purge vessel and skirts 104, 105 on the exterior walls of the insert 132 may provide void spaces below them to add or remove gas.

In some approaches, skirts 106 may be formed by having the upper portion of the purge vessel 122 with a smaller internal diameter, and a lower portion of the purge vessel 122 with a larger internal diameter, thereby defining a gap there between for transporting gas to the solids/gas mixture within the purge vessel 122, as shown in FIG. 1. A conduit may transport gas to and/or from the skirt 106.

In some embodiments, a conduit 136 for transporting a gas to an area directly below the inverted cone 124, or any other section of the insert 132, such as member sections 126, 134 may be included. Note that in this and other embodiments, additional member sections of the insert 132 may form portions of a conduit 136, such as by being hollow, having internal conduit portions, etc.

In some approaches, one or more supports 114 may be provided from the purge vessel 122 wall to the insert 132 to hold it in place and provide passage ways in or under the insert 132 to add gas. The supports 114 may further provide an area for a conduit 136 to provide gas from the surface interface of the solids/gas mixture, such as by housing the conduits, providing support for the conduits, holding the conduits, etc. One or more of the conduits 136 may also be connected to the insert 132 independently of one or more of the supports 114. For the sake of simplicity, each of the conduits 136 also is included with a support 114 in FIG. 1, but this in no way limits the orientation, placement, and selection of the supports 114 and/or conduits 136 that can be used in any embodiments.

In some embodiments, all or some supports, conduits, pipes, etc., that pass through the flow area, including supports 114, may have a flow enhancing top edge, such as a knife edge, to minimize flow disruption.

In some embodiments, each conduit 136 may provide to or remove gas from the member 125 through skirts extending outwardly from the member 125. For example, a skirt, such as skirt 104, may wrap around one of the member sections, such as member section 126, as shown in FIG. 1.

In some approaches, the skirts 104, 105, 108 preferably may have an almost uniform profile extending outwardly from the interior of the purge vessel 122 and extending outwardly from the exterior of the insert 132. For example, the skirts 104, 105, 108 may wrap completely around the surface circumference of the part it is attached to, whether that part is the purge vessel 122 or the insert 132. In additional approaches, the skirts 104, 105, 108 may be segmented, and these segmented skirts may be placed on different locations relative to the longitudinal axis of the purge vessel 122 and the insert 132, or may be placed at the same position relative to the purge vessel 122 and the insert 132 longitudinal axis. In any approach, each skirt may be designed such that it has a constant structural member connected above and below the skirt in a manner which provides structural support for the parts above and below the skirt. In this way, a single support 114 may be used to support each insert 132 rather than having multiple supports 114.

In several approaches, each skirt, such as skirts 104, 105, 108, may include a friction-reducing coating on at least the exterior, solids/gas mixture contacting surfaces. Illustrative friction-reducing coatings include fluorpolymers such as polytetrafluoroethylene (PTFE), fluorinated ethylene-propylene (FEP), PLASITE 7122 TFE, etc. Some of the preferred coatings are sold under the TEFLON® name brand, and may be obtained from DUPONT having a sales office in Wilmington, Del., USA.

In some embodiments, a member 125 under the inverted cone 124 has dimensions that cause the solids/gas mixture passing there along between the member and the purge vessel 122 to have about a constant velocity profile there across may be included. A member section, such as member section 126, may allow addition of gas to the solids/gas mixture. As shown in FIG. 1, there may be a port near the upper portion of member section 126 that allows gas to escape into the solids/gas mixture after being deflected off the inverted cone 124. In addition, skirts such as skirts 104 may surround the lower circumference of the member section 126 such that gas may be added to the solids/gas mixture. One or more member sections may be used in any insert 132, depending on several factors including length of the purge vessel 122, flow velocity of the solids/gas mixture, gas flow rate, etc.

In some approaches, another type of member section may be used which does not have a gas port on the upper portion. One or more of these member sections 116 may be used with each insert 132. A member section 116 may allow addition of gas to the solids/gas mixture, by simply providing a gas supply to this member section 116, which may be provided through an independent conduit, or may be provided through a gas conduit which also provides gas to another member section, such that another conduit does not need to be included in the solids/gas mixture flow path. To accomplish this, a gas supply conduit may be included internally of the insert 132, such that each member section which provides gas to the solids/gas mixture is supplied from a single gas conduit, allowing a single support 114 to fully support the insert 132. Examples of this internal gas supply conduit include a pipe, tube, passage, etc., that may run vertically along each member section comprising the insert 132, such that each member section is capable of pulling gas from the common supply.

In some approaches, a member section, such as member section 134, may provide gas to the surface interface of the solids/gas mixture. The independent conduits may have the same support 114, may be independently supported, or may be independently piped from the supports 114.

In some preferred approaches, the lowest member section under the inverted cone 124 may be tapered such that the lower portion of the lowest member section may have a smaller exterior diameter than the upper portion of the lowest member section, as shown in FIG. 1, thus promoting more uniform solids/gas mixture flow across the external surfaces of the member 125. The lowest member section may also include a gas injection point such that gas may be added to the solids/gas mixture at some point near the lower portion of the lowest member section, such as shown in member section 134.

The angle of the cone 124 and skirts 104, 105, 108 may be sufficiently steep as to allow the solids/gas mixture to slide on the exterior cone 124 and skirt 104, 105, 108 surfaces and may promote solids mass flow. Preferably, the flow of solids vertically downward through the purge vessel 122 may approach plug flow.

Each cone 124 and skirts 104, 105, 108 may have a "void space" below that includes an angle of repose depending on the characteristics of the solids/gas mixture and the angle of the cone 124 or skirts 104, 105, 108. The void space under the cone 124 and skirts 104, 105, 108, due to the angle of repose of the solids/gas mixture, may provide a surface interface within the purge vessel 122 to add gas.

By minimizing the distance between the member 125 exterior and purge vessel 122 interior by selecting a large diameter for the member diameter α in comparison to the purge vessel interior diameter β, protrusion of the cone 124 and skirts 104, 105, 108 into the solids/gas mixture flow path may be minimized. This in turn may minimize any undesired changes in the solids/gas mixture's flowing velocity, thus resulting in substantially plug flow.

In some embodiments, a single gas discharge point 128 may be used within a plenum inside a member section, such as member section 126 or 116, connected to a skirt, such as skirt 104, to provide a uniform flow of gas to the surface interface of the solids/gas mixture in the purge vessel 122.

Multiple inlet nozzles 110 may be used for purge vessel wall skirts 108 and cone skirts 104 to distribute the gas flow more evenly.

The benefits of these embodiments are that the insert 132 may promote solids mass flow in the purge vessel 122 while the solids/gas mixture maintains a mass flow pattern wherein the solids flow may approach plug flow in the gas injection and removal sections. For example, near plug flow may be achieved under the influence of gravity, where the skirt protrusion(s) at the larger diameters maximize the area under each of them and minimize the solids/gas mixture velocity changes. Having one insert 132 minimizes the supports 114 required to support it, compared to multiple inverted cones each requiring its own support(s). The insert design disclosed herein should promote a solids flow pattern that more closely approaches plug flow than designs that utilize multiple internal cones.

In use, gas is let into the purge vessel via the various conduits 108 and 110, perhaps conduits through the supports 114 and the skirt 106, in such a manner that the gas flows through the purge vessel in a countercurrent fashion to the particulate polyolefin product at a velocity that exceeds 50% of the calculated minimum fluidization velocity of the polyolefin product particles in the purge vessel.

Figure 2:
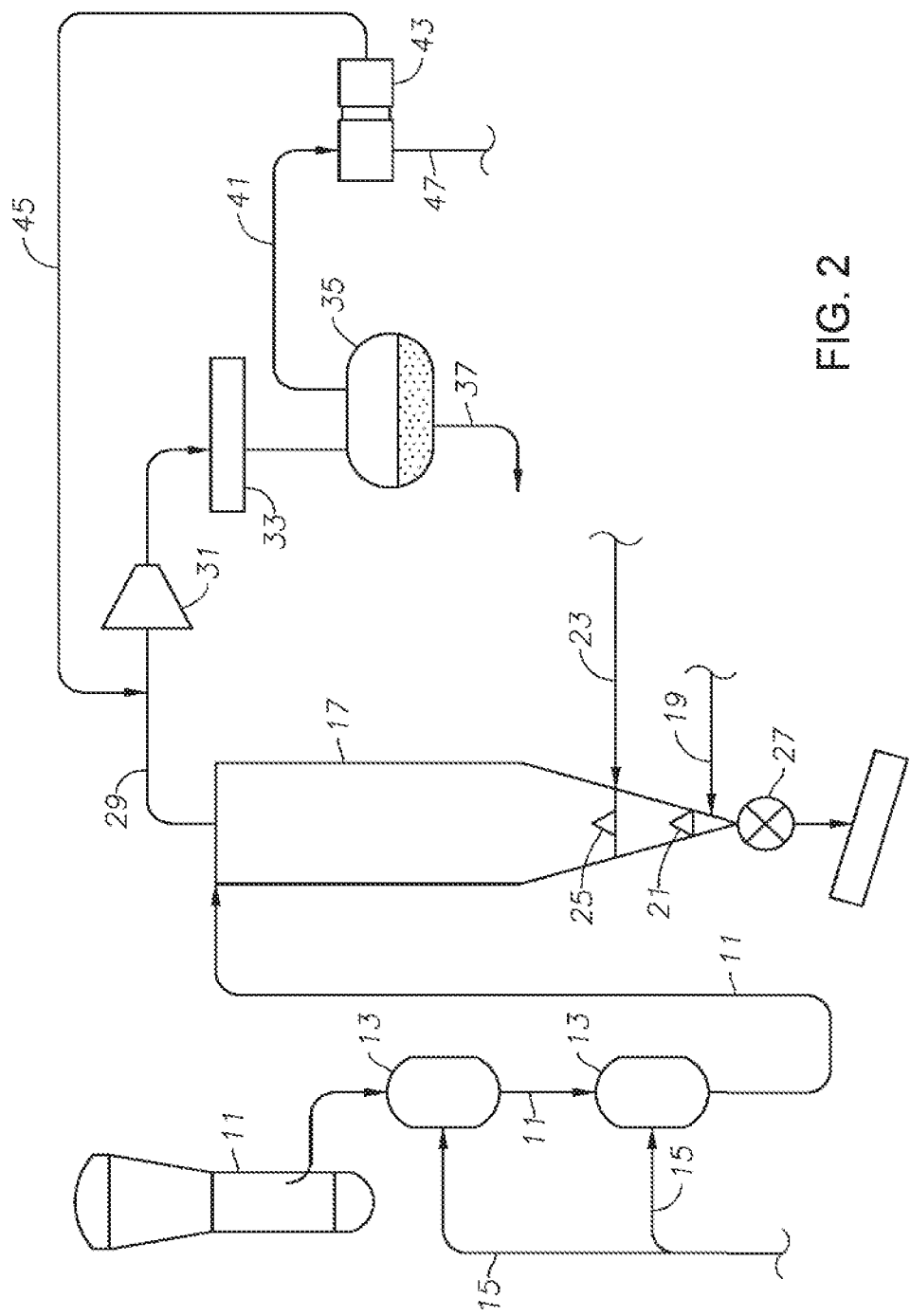
FIG. 2 represents a polyolefin polymer production process.

FIG. 2 is a simplified view of part of the product recovery section of a gas phase ethylene polymerization process in which the presently disclosed method can be used. In the process shown in FIG. 2, ethylene is polymerized in a gas phase reactor 11 and particulate polyethylene product is discharged from the reactor 11 and fed to a plurality of product discharge tanks 13. Entrained with the particulate polyethylene product are unreacted ethylene monomer and $C_4$ to $C_6$ alkanes added to the reactor 11 to assist in heat removal during polymerization.

An assist gas is supplied to the product discharge tanks 13 via line 15 to convey the particulate polyethylene product to the upper end of a vertically disposed purge vessel 17 which, at its lower end, receives a supply of fresh nitrogen purge gas via line 19 and a first distributor 21. The purge vessel 17 also receives a supply of an ethylene-containing recycle gas as "stripping gas" via line 23 and a second distributor 25. Each distributor distributes its respective gas evenly into the purge vessel. The purge and/or stripping gas is delivered to the purge vessel at a velocity that is greater than 50% of the calculated $U_{mf}$, and may be up to 135% or greater of the calculated $U_{mf}$. The purge and/or stripping gas can be delivered to the purge vessel at any rate intermediate between these values.

As the particulate polyethylene product flows downwardly through the purge vessel 17, it is sequentially contacted by the ethylene-containing recycle gas and the nitrogen purge gas flowing upwardly through the purge vessel 17. As a result, the unreacted ethylene monomer and $C_4$ to $C_8$ alkanes entrained in the particulate polyethylene product are stripped from the product and exit the purge vessel 17 with the nitrogen purge gas and stripping gas as a first gaseous effluent stream. The stripped polyethylene product collects at the lower end of the purge vessel 17, from which it can be removed via valve 27 for further processing.

The first gaseous effluent stream is fed via discharge line 29 to a compressor 31 and then a cooler 33 so as to condense at least part of the $C_4$ to $C_6$ alkanes in the first effluent stream. The pressurized and cooled first effluent stream is then fed to an accumulator 35 where the condensed alkanes and alkenes are separated and recovered via line 37 to leave a second gaseous effluent stream. Part of the second gaseous effluent stream is removed from the accumulator 35 and recycled as assist gas in line 15, while the remainder of the second gaseous effluent stream is supplied by line 41 to a membrane separator 43.

The membrane separator 43 separates the second gaseous effluent stream into a first fraction rich in heavy hydrocarbon impurities as compared with the second gaseous effluent stream and a second fraction lean in heavy hydrocarbon impurities as compared with the second gaseous effluent stream. The first fraction is recycled via line 45 to the input of the compressor 33, while the second fraction is removed via line 47 and supplied to line 23 as the ethylene-containing recycle gas.

FIG. 1 and FIG. 2 of U.S. Pat. No. 4,372,758 also illustrate arrangements in which the presently disclosed method can be implemented. In such arrangements, the introduction of the gas via line 20 in FIG. 1 or via line 33 in FIG. 2 is in accord with the claimed invention.

While potentially applicable to any resin production process, the disclosed method finds particular advantage in applications where minimum fluidization velocity concerns limit purging, for example, as in gas phase polyolefin production processes. The disclosed method is advantageous in processes characterized by one or more the following:

a. using a small diameter purge bin;
b. producing resin of small particle size; and
c. when purge flow requirements rise to the fluidization limit (e.g. due to low product density or temperature).

When limited as above, purging in excess of the theoretical minimum fluidization velocity extends the purging process operating window to more challenging product grades, enabling operation at lower emissions and/or higher production rates on reactors while avoiding the significant capital cost of larger purgers. In some instances (e.g., small APS, low density resin product, and low operating temperature) the presently disclosed method solves the problem of not being able to purge to environmental limits at a practical rate.

Another advantage that is seen in some embodiments of the disclosed method is that unprecedentedly low residual Volatile Organic Compound (VOC) levels can be obtained with very high purge rates for resins lacking bound hydrocarbons. Such high purge rates might be practically obtained through use of high recycle of recovered purified (free of heavy hydrocarbons) purge gas. This approach both enables greater use of recovered lights and provides an approach to lower emissions replacing more costly collection and treatment options in new facilities.

Some embodiments of the disclosed method might not exhibit all of the advantages described above. Any given embodiment might exhibit any one or more of the advantages described above.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1

Purging experiments were run on a metallocene-catalyzed ethylene-hexene copolymer produced in a gas phase fluidized bed reactor. $U_{mf}$ was calculated as described above. Purge gas velocities of 80-95% $U_{mf}$ were typical, with occasional levels as high as 130% $U_{mf}$. At no point was a hydrocarbon breakthrough consistent with resin backmixing detected at the purger outlet. Headspace VOC samples taken during the run were consistent with established purging correlations, indicating no loss of purging effectiveness at these rates.

Example 2

The experiments of Example 1 were repeated with purge gas velocities of 90-105% $U_{mf}$ being typically employed throughout the campaign, with occasional levels as high as 135% $U_{mf}$. Results were identical to Example 1.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for the removal of unreacted olefin monomer(s) from polyolefin product particles of an olefin polymerization reaction, the method comprising:
    contacting the polyolefin product particles with a countercurrent flow of a purge gas in a purge vessel under conditions allowing diffusion of unreacted monomer and other gaseous substances from the polyolefin product particles into the countercurrent flow of the purge gas to produce purged particles;
    wherein the velocity of the purge gas exceeds 50% of the calculated minimum fluidization velocity of the polyolefin product particles in the purge vessel ($U_{mf}$); and
    further wherein the polyolefin product particles move through the purge vessel in a mass flow regime.
2. The method of claim 1, in which the velocity of the purge gas is ≥85% of the calculated $U_{mf}$.
3. The method of claim 1, in which the velocity of the purge gas is in the range from 85% to 95% of the calculated $U_{mf}$.
4. The method of claim 1, in which the velocity of the purge gas is ≥90% of the calculated $U_{mf}$.
5. The method of claim 1, in which the velocity of the purge gas is in the range from 90% to 105% of the calculated $U_{mf}$.
6. The method of claim 1, in which the velocity of the purge gas is ≥100% of the calculated $U_{mf}$.
7. The method of claim 1, in which the velocity of the purge gas is in the range from 105% to 135% of the calculated $U_{mf}$.
8. The method of claim 1, in which $U_{mf}$ is calculated by:
    i) calculating an Archimedes number (Ar) for a spherical particle model as:

$$Ar = \frac{\rho_g d_p^3 (\rho_p - \rho_g) g}{\mu^2};$$

ii) calculating a Reynolds number ($Re_{p,mf}$) by solving the polynomial:

$$Re = \sqrt{33.7^2 + 0.0408 Ar} - 33.7; \text{ and}$$

iii) calculating $U_{mf}$ as:

$$U_{mf} = \frac{(Re_{p,mf})\mu}{\rho_g d_p};$$

wherein $\rho_g$ is the purge gas density, $\rho_p$ is the particle density, $d_p$ is the Sauter mean particle size, g is the acceleration due to gravity, and $\mu$ is the fluid viscosity.
9. The method of claim 8, in which the Sauter mean particle size is from 325 to 775 microns.
10. The method of claim 1, in which the polyolefin product particles have a density that ranges from 0.870 to 0.950 g/cm$^3$.
11. The method of claim 1, in which the olefin polymerization reaction is a gas phase polymerization.
12. The method of claim 1, in which the purged particles are collected upon a conical base of the purge vessel.
13. The method of claim 1, in which polyolefin product particles comprise polyethylene polymers; and further in which the unreacted monomers comprise $C_4$ to $C_8$ alpha-olefins.

* * * * *